Dec. 24, 1935.  W. B. FAGEOL  2,025,502
UNIVERSAL JOINT CONSTRUCTION
Filed Jan. 29, 1934

Inventor
William B. Fageol

By Strauch & Hoffman
Attorneys

Patented Dec. 24, 1935

2,025,502

UNITED STATES PATENT OFFICE 2,025,502

UNIVERSAL JOINT CONSTRUCTION

William B. Fageol, Kent, Ohio, assignor to Twin Coach Company, Kent, Ohio, a corporation of Delaware Application January 29, 1934, Serial No. 708,913

7 Claims. (Cl. 64—17)

The present invention relates to improvements in universal joint constructions and more particularly to improvements in universal joints of the type employed between angularly disposed shafts as described in my application Serial No. 334,764 of which this application is a continuation-in-part.

Universal joints for service of the character mentioned have heretofore been provided with a central lubricating chamber or space from which lubricant is fed outward through trunnion members to bearings therefor. In such joints it has been the common practice to provide lubricating fittings such for example as alemite fittings to permit the forcing of lubricant into the lubricating chambers under heavy pressure.

In view of the practice of utilizing heavy pressures to force lubricant or grease through fittings of the character mentioned particularly under high pressures commonly utilized in lubricating motor vehicles, serious injury occurs to the joint due to the building up of excessive internal pressures in the joint. Frequently the pressures developed are sufficient to subject the metallic parts of the joint to such serious strains that in many instances the joints are sprung out of shape and the effectiveness thereof is considerably reduced, if not permanently impaired.

I have also discovered that the life of universal joints of the character mentioned is considerably shortened by failure of proper distribution of lubricant on the trunnion members and to the trunnion bearings of the joints, and that by proper lubricating, the life and serviceability of such joints may be considerably increased and the cost of maintenance substantially reduced.

To permit the escape of air from the lubricating chambers of universal joints it has heretofore been proposed to provide relief valves for the chambers. While preventing the building up of excessive pressures in the lubricating chamber of the universal joints such prior arrangements permit substantially complete loss of lubricating fluid under the action of centrifugal force from the lubricating chamber so that the effectiveness becomes seriously impaired and serious injury due to lack of lubricant frequently occurs.

Accordingly, a primary object of the present invention is to provide novel universal joint constructions in which destructive pressures of lubricant can not be built up during filling operations, and in which at the same time loss of lubricants due to centrifugal force in operation is eliminated.

Another object of the invention is to provide novel lubricating arrangements for universal joints by means of which lubrication is distributed in efficient manner, losses of lubricant by the action of centrifugal force are avoided, and in which the useful life of the joints is considerably increased in service, while the cost of maintenance is materially reduced.

Further objects of the invention will appear from the following detailed description of preferred embodiments thereof and are such as are defined by the terms of the appended claims. Reference will be had to the accompanying drawing in which is illustrated certain specific embodiments of my invention and in which:

Figure 1:
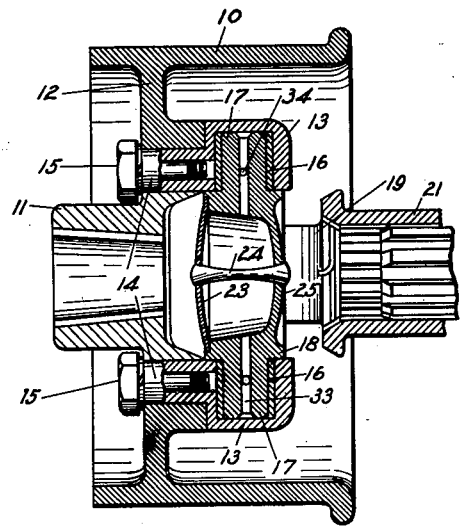
Figure 1 is a vertical sectional view showing a form of universal joint embodying my invention.
Figure 3:
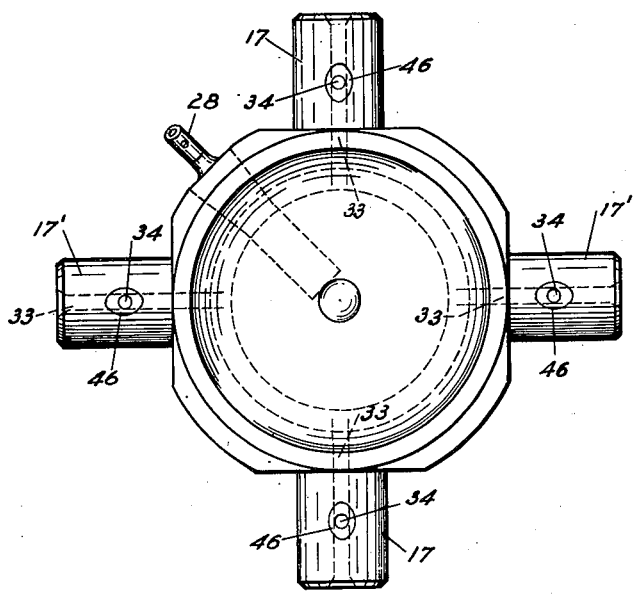
Figure 3 is an end view of the central trunnion member of the form of joint shown in Figure 1.
Figure 2:
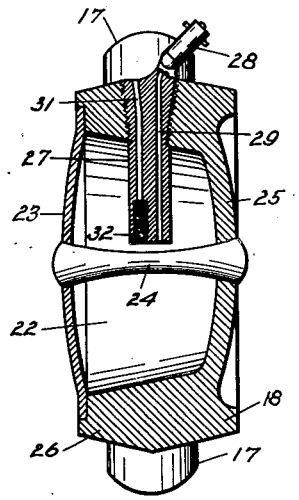
Figure 2 is a sectional view of the central trunnion member of the form of joint shown in Figure 1.

Referring to the drawing in the various figures of which like characters designate like parts, as shown in Figures 1 and 2, a propeller shaft brake drum and universal joint driving member 10 is provided with a splined hub 11 to receive the end of a propeller shaft and a web 12 in which vertically alined trunnion bearing members 13 are secured by means of the shanks 14 which extend through diametrically opposed bores formed in web 12 and are held in position by the nuts 15 and suitable washers in well known manner. The bearing members 13 are provided with bushings 16 in well known manner. Journaled in the bushings 16 are the vertically opposite and axially alined trunnion members 17 which are formed integrally on the improved trunnion supporting member 18 which is further provided with integral trunnion members 17' horizontally disposed and axially alined to which the laterally spaced ears 19 of the splined shaft receiving extension 21 are pivotally secured in well known manner. Member 18 is provided with a central lubricant receiving chamber 22. Chamber 22 is closed by a cover plate 23 which is held in position by a central strengthening rod 24 the ends of which extend through the plate 23 and end wall 25 of member 18 and are riveted in position. Extending through a threaded hole in the peripheral wall 26 of member 18 and detachably screwed in position is a combined filling and vent valve plug 27 provided with a suitable lubricating fitting 28 containing a check valve through which lubricants may be forced into the passage 29 of plug 27 and into the chamber 22. Formed in plug 25 is a pressure relief passage 31 which at its outer end communicates with the atmosphere and at its inner end terminates in the check valve 32.

It will be noted that the inner ends of passages 29 and 31 communicate with the chamber 22 at substantially the center thereof as a result of which if either or both of the valves fail to function in operation no substantial loss of fluid due to centrifugal force will occur outward through the passages 29 and 31.

When the joint is to be lubricated, lubricant is forced under heavy pressure in the usual manner through the fitting 28 and through passage 29 into the interior of chamber 22 under comparatively heavy pressures. The chamber 22 is filled with lubricant and as the pressures exceed a predetermined value, check valve 32 will open and the chamber 22 will then vent to atmosphere so that no excessive pressures can be built up therein. Injury to the joint parts is therefore eliminated.

The lubricant from the central chamber 22 is distributed outward by pressures built up and by the action of centrifugal force through passages 33 and 34 to the trunnion bearings 13 and bearings carried by ears 19. It will be noted that the inner ends of passages 29 and 31 terminate adjacent the center of chamber 22 so that in operation of joints no tendency for the lubricant to pass out through the passages by centrifugal force exists, and even though the check valves may not function properly no loss of lubricants occurs in operation through these passages.

To provide for more effective distribution of lubricant in the trunnion bearings at the outlets of passages 34, trunnions 17 are provided with flattened portions 46 adjacent the ends of passages 34 which aid materially in distributing lubricants from the passages 33 to the trunnion bearings thus increasing the efficiency and effectiveness of the joints.

As shown in the drawing, the relief passage 31 and the valve assembly preferably are of slightly greater flow capacity than the inlet passage 29, in order to insure that there can be no sudden pressure built-up which might cause distortion or shifting of the plate 23, with later resultant loss of lubricant to cause damage to the bearings. This feature is particularly desirable in joints of the needle bearing type where there are gasket seals adjacent the bearings which may fail partially or entirely under excessive pressure.

It will be noted that the manner of lubrication and the method of preventing loss of the lubricant due to centrifugal force may be applied to other types of universal joints such for instance as those employing needle bearings for rotatable support of the trunnions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed and desired to be secured by United States Letters Patent is:—

1. A universal joint comprising a trunnion supporting member; means provided with bearings for cooperation with the trunnions of said trunnion supporting member; said trunnion supporting member comprising a peripheral portion with which said trunnions are integrally formed, an end wall, and a cover plate, said peripheral portion, end wall and cover plate defining a lubricating chamber; passages extending through said trunnions and said peripheral portion for conducting lubricant from said chamber to said bearings under the action of centrifugal force; a plug having the outer end thereof threadedly engaged in said peripheral portion and the inner end thereof extending into said chamber and terminating substantially centrally thereof; a pair of passages extending through said plug longitudinally thereof; one of said passages communicating at the inner end thereof with said chamber and provided at the outer end thereof with a valved fitting for injecting lubricant into said chamber under pressure; the other of said passages communicating at the outer end thereof with the atmosphere and provided at the inner end thereof with a pressure relief valve.

2. A universal joint comprising a trunnion supporting member provided with a lubricating chamber; trunnions on said member; means provided with bearings for cooperating with said trunnions; lubricating passages in said trunnion supporting means communicating with said lubricating chamber and said bearing means; a lubricant feeding passage communicating with said chamber centrally thereof; and a vent passage communicating with the atmosphere and said lubricating chamber centrally thereof whereby loss of lubricant through said passages from said chamber by the action of centrifugal force is avoided, said lubricant feeding passage and said vent passage being formed in a plug detachably engaged in said trunnion supporting member and projecting within said lubricating chamber.

3. A universal joint comprising a trunnion supporting member; means provided with bearings for cooperating with the trunnions of said trunnion supporting member; said trunnion supporting member comprising a peripheral portion with which said trunnions are integrally formed, an end wall and a cover plate, said peripheral portion, end wall and cover plate defining a lubricating chamber; passages extending through said trunnions and said peripheral portions for conducting lubricant from said chamber to said bearings under the action of centrifugal force; means communicating with said chamber centrally thereof whereby lubricant may be fed into said chamber; and a pressure relief means communicating with said chamber substantially centrally thereof whereby loss of lubricant from said chamber under the action of centrifugal force is avoided through either of said two means, said lubricant feeding means and said relief means each comprising valved passages formed in a plug detachably connected with the peripheral portion of the trunnion supporting member and communicating with said chamber substantially at the center thereof.

4. A cross for a universal joint comprising a body portion with trunnions supported thereon; passages extending through said trunnions and said body portion for conducting lubricant from the latter to said trunnions; a plug mounted on said cross extending into and terminating substantially centrally of said body portion, said plug having a plurality of passages extending longitudinally thereof, one of said passages communicating at the inner end thereof with the lubricant passages extending through said body portion and provided at the outer end thereof with a valved fitting for injecting lubricant into said passages under pressure, another of said passages communicating at the outer end thereof with the atmosphere and provided at the inner end thereof with a pressure relief valve, both of said passages terminating substantially centrally of said cross whereby loss of lubricant due to the action of centrifugal force is prevented.

5. A cross for a universal joint comprising a body portion with a lubricant chamber therein; trunnions on said body portion with passages therein communicating with said lubricant chamber; a plug mounted on said cross with a plurality of passages therein, one of said passages communicating at its inner end with said lubricant chamber and arranged to connect at its outer end with means for supplying lubricant under pressure, another of said passages communicating at its outer end with the atmosphere and at its inner end with said lubricant chamber, said inner end having a pressure relief valve mounted thereon, both of said passages terminating at their inner ends substantially centrally of said cross whereby loss of lubricant due to the action of the centrifugal force is prevented.

6. A cross for a universal joint comprising a body portion with a lubricant chamber therein; trunnions on said body portion with passages therein communicating with said lubricant chamber; and having bearing surfaces thereon, said bearing portions being provided with flattened portions adjacent the ends of said passages for effective distribution of lubricant; a plug mounted on said cross with a plurality of passages therein, one of said passages communicating at its inner end with said lubricant chamber and arranged to connect at its outer end with means for supplying lubricant under pressure, another of said passages communicating at its outer end with the atmosphere and at its inner end with said lubricant chamber, said inner end having a pressure relief valve mounted thereon, both of said passages terminating at their inner ends substantially centrally of said cross whereby loss of lubricant due to the action of centrifugal force is prevented.

7. A cross for a universal joint comprising a body portion with trunnions supported thereon; passages extending through said trunnions and said body portion for conducting lubricant from the latter to said trunnions; a plug mounted on said cross extending into and terminating substantially centrally of said body portion, said plug having a plurality of passages extending longitudinally thereof, one of said passages communicating at the inner end thereof with the lubricant passage extending through said body portion and provided at the outer end thereof with a valved fitting for injecting lubricant into said passage under pressure, another of said passages communicating at the outer end thereof with the atmosphere and provided at the inner end thereof with a pressure relief valve, said latter passage and relief valve being of relatively greater flow capacity than said first passage, both of said passages terminating substantially centrally of said cross whereby loss of lubricant due to the action of centrifugal force is prevented.

WILLIAM B. FAGEOL.